(12) United States Patent
Hain et al.

(10) Patent No.: US 11,270,465 B2
(45) Date of Patent: Mar. 8, 2022

(54) MULTIPLE CAMERA CALIBRATION

(71) Applicant: Brainlab AG, Munich (DE)

(72) Inventors: Torsten Hain, Freising (DE); Lars Dohmen, Munich (DE); Thomas Radl, Munich (DE)

(73) Assignee: Brainlab AG, Munich (DE)

( * ) Notice: Subject to any disclaimer, the term of this patent is extended or adjusted under 35 U.S.C. 154(b) by 241 days.

(21) Appl. No.: 16/629,242

(22) PCT Filed: Nov. 23, 2018

(86) PCT No.: PCT/EP2018/082379
§ 371 (c)(1),
(2) Date: Jan. 7, 2020

(87) PCT Pub. No.: WO2020/104041
PCT Pub. Date: May 28, 2020

(65) Prior Publication Data
US 2021/0225032 A1    Jul. 22, 2021

(51) Int. Cl.
*G06T 7/80* (2017.01)

(52) U.S. Cl.
CPC ...... *G06T 7/80* (2017.01); *G06T 2207/10116* (2013.01); *G06T 2207/30204* (2013.01); *G06T 2207/30244* (2013.01)

(58) Field of Classification Search
CPC ............. G06T 7/80; G06T 2207/10116; G06T 2207/30204; G06T 2207/30244; G06T 2207/20221; G06T 2207/30008; G06T 2207/30208; G06T 7/73
See application file for complete search history.

(56) References Cited

U.S. PATENT DOCUMENTS

| 6,437,823 B1 | 8/2002 | Zhang |
| 8,619,144 B1 | 12/2013 | Chang et al. |
| 2019/0000372 A1* | 1/2019 | Gullotti ................ A61B 5/4566 |

(Continued)

OTHER PUBLICATIONS

Knorr, Moritz "Online Extrinsic Multi-Camera Calibration Using Ground Plane Induced Homographies" IEEE Intelligent Vehicles Symposium (Year: 2013).*

(Continued)

*Primary Examiner* — Kim Y Vu
*Assistant Examiner* — Molly Delaney
(74) *Attorney, Agent, or Firm* — Tucker Ellis LLP

(57) ABSTRACT

Provided is a method for generating pose transformation data between first and second rigidly mounted digital cameras having non-coincident fields of view. The method includes obtaining a first plurality of images of a first calibration object, obtaining a second plurality of images of the first or a second calibration object, generating first and second object point data, generating first and second calibration data of the first and second digital cameras, determining first pose data between a first frame of reference of the first digital camera and the frame of reference of the first calibration object, determining second pose data between the frame of reference of the second digital camera and the frame of reference of the first or second calibration objects, and calculating the pose transformation data between the pose of the first digital camera and the pose of the second digital camera.

20 Claims, 6 Drawing Sheets

(56) References Cited

U.S. PATENT DOCUMENTS

2020/0321099 A1* 10/2020 Holladay ............... G16H 30/20
2021/0110560 A1* 4/2021 Knorr .................... G06T 7/579

OTHER PUBLICATIONS

Carrera, Gerardo "SLAM-Based Automatic Extrinsic Calibration of a Multi-Camera Rig" IEEE Conference on Robotics and Automation (Year: 2011).*

Sandro Esquivel et al.: "Calibration of a Multi-Camera Rig from non-overlapping views", Sep. 12, 2007. 10 pages.

International Search Report and Written Opinion for corresponding International Application No. PCT/EP2018/082379, dated Aug. 9, 2019. 8 Pages.

Guan Banglei et al., A simple and flexiable calibration method of non-overlapping camera rig, Visual Communications and Image Processing; Jan. 20, 2004, San Jose, vol. 9528, May 18, 2015, pp. 95280Y-95280Y. 6 Pages.

International Preliminary Report on Patentability for corresponding International Application No. PCT/EP2018/082379, dated Jun. 3, 2021. 6 pages.

* cited by examiner

MULTIPLE CAMERA CALIBRATION

RELATED APPLICATION DATA

This application is a national phase application of International Application No. PCT/EP2018/082379 filed Nov. 23, 2018, the contents of which is incorporated herein by reference.

FIELD OF THE INVENTION

The present invention relates to a computer-implemented method for generating pose transformation data between first and second rigidly mounted digital cameras having non-coincident fields of view, a corresponding device, calibration rig, system, computer program element, a non-transitory program storage medium for storing such a program and a mobile computing device for executing the program.

TECHNICAL BACKGROUND

Electronic equipment is increasingly being used during medical interventions to provide assistance to medical personnel performing the medical intervention. For example, during a bone surgery operation, a camera can be mounted to an intervention tool. The camera is directed towards an intervention area of the patient, and an augmented field of view containing the intervention area of the patient is displayed to a medical professional (substantially in real-time), with various indications that can, for example, indicate to the medical personnel an optimal trajectory for a tool used in the intervention. The augmented field of view is relayed to the medical personnel during the intervention to improve accuracy of, for example, the accuracy of the angle of a bone cut.

Custom electronic equipment to perform such tasks may be designed, but it is more attractive to use existing electronic equipment, such as a "smartphone". A smartphone usually has a forward-facing camera and a rear-facing camera. Application development frameworks for the Apple iPhone™ operating system or the Android™ operating system are well-developed. In this way, instead of designing custom electronic equipment to generate an augmented field of view, an "off-the-shelf" hardware item merely needs to be reprogrammed with updated software, thus significantly simplifying the cost of development. However, there are still challenges to developing reliable augmented field of view solutions using commodity hardware such as a smartphone.

SHORT DESCRIPTION OF THE INVENTION

The present invention has the object of improving the accuracy of augmented field of view solutions using commodity hardware such as a smartphone.

The present invention can be used for, for example, orthopaedic procedures e.g. in connection with a system for image-guided surgical intervention. Although not so limited, the technique discussed in the application may be useful for calibrating a smartphone used as an aid during total knee replacement, in which the technique helps to align the cutting blocks at the distal femur and the proximal tibia bone. Another potential application is during hip surgery (total hip replacement).

Aspects of the present invention, examples and exemplary steps and their embodiments are disclosed in the following.

Different exemplary features of the invention can be combined in accordance with the invention wherever technically expedient and feasible.

Image guided surgery approaches using commodity electronic hardware (such as a smartphone, for example) can be provided that use both a front-facing and a rear facing digital camera of the smartphone (in combination with navigation markers) to align a surgical tool connected to the smartphone during a medical procedure.

However, an image-guided assisted medical procedure (for example the replacement surgery) requires at least sub-millimetre accuracy for the best surgical outcomes. The front-facing and rear-facing digital cameras of a commodity smartphone are often not accurately secured to the printed circuit board of a smartphone, for example, leading to a significant deviation in pose of the first and second digital cameras compared to the pose across different smartphones that would be expected if the first and second digital cameras were to be perfectly aligned with the body of the smartphone.

The present application discloses a technique to calibrate the first and second digital cameras of a smartphone by firstly individually calibrating the first and second digital cameras to calibration targets held within a common frame of reference. Then, a multi-camera calibration can be used to determine the pose relationship between the first and the second digital cameras.

GENERAL DESCRIPTION OF THE INVENTION

In this section, a description of the general features of the present invention is given for example by referring to possible embodiments of the invention.

The present invention also relates to the use of the device/system of the previous aspects or any embodiment thereof for image-guided surgery.

According to a first aspect, there is provided: a computer-implemented method for generating pose transformation data between first and second rigidly mounted digital cameras having non-coincident fields of view, comprising:

obtaining, using the first digital camera, a first plurality of images of a first calibration object in a frame of reference of a first calibration object indexed to a corresponding first plurality of measured linear displacement data of the distance between the first digital camera and the first calibration object;

obtaining, using the second digital camera, a second plurality of images of the first or a second calibration object in the frame of reference of the respective first or second calibration objects indexed to a corresponding second plurality of measured linear displacement data of the distance between the second digital camera and the first or the second calibration object;

generating first and second object point data based, respectively, on the first and second pluralities of images and their respective measured linear displacement data, and a prior specification of the first and/or second calibration objects;

generating first and second calibration data of the first and second digital cameras based, respectively, on the first and second object point data;

determining first pose data between a first frame of reference of the first digital camera and the frame of reference of the first calibration object using the first calibration data;

determining second pose data between the frame of reference of the second digital camera and the frame of reference of the first or second calibration objects using the second calibration data; and calculating the pose transformation data between the pose of the first digital camera and the pose of the second digital camera as a function of the first and second pose data.

An effect is that the difference in mounting orientation or pose (pose transformation data) between a first and second camera comprised within, for example, a commodity smartphone may be accurately determined using a calibration pattern by obtaining images of the calibration pattern using the first and second cameras whilst moving the smartphone along one degree of freedom (linear displacement between the phone and the calibration pattern). Having calculated the pose transformation data (comprising, for example, intrinsic and extrinsic camera parameters), an augmented reality application (for example, for medical intervention) may be provided on a smartphone calibrated using this method using the pose transformation data. The computation of pose transformation data (including the calibration parameters, for example) can be simplified when the calibration environment (dimensions of the calibration target and/or calibration rig, known dimensions of features of the patterns on the calibration rig, known relative position of the patterns to the calibration gauge (shuttle), known precise motion of the cameras, and position of the camera to test in the calibration environment, for example) in which camera system is located is known in advance.

According to an embodiment, generating first object point data further comprises:

extracting first feature point layer data of a first image in the first plurality of images;

extracting second feature point layer data of a second image in the first plurality of images;

comparing the feature point layer data to the prior specification of the first calibration object;

generating first object point data corresponding to the first feature point layer data associated with the measured linear displacement data of the distance between the first calibration object and the first digital camera; and generating second object point data corresponding to the second feature point layer data associated with the measured linear displacement data of the distance between the first calibration object and the first digital camera.

An effect is that a first and a second plane of object points at first and second known distances from the digital camera is generated.

According to an embodiment of the first aspect, generating first calibration data of the first digital camera further comprises:

generating one or more 3D point clouds using the first object point data and the second object point data; and generating first calibration data of the first digital camera by applying a homography algorithm to the one or more 3D point clouds.

An effect is that intrinsic and/or extrinsic camera parameters comprising, for example, a pose of the first digital camera relative to a calibration rig used to obtain the first and second object point data information using the first digital camera can be calculated. Arbitrary "point clouds" are provided comprised of points at known locations obtained in the feature point layer data. Because the points in the point cloud have a known location, a homography algorithm can be applied to generate pose information of the first digital camera.

According to an embodiment of the first aspect, the first calibration data of the first digital camera comprises intrinsic and/or extrinsic calibration parameters of the first digital camera.

An effect is that intrinsic and/or extrinsic calibration parameters of first and/or second cameras of a smartphone, for example, can be obtained in a simple way.

According to an embodiment of the first aspect, there is further provided obtaining the first plurality of images of the first calibration object and the second plurality of images of the second calibration object, wherein the first and second calibration objects are aligned parallel planes arranged to face each other along an axis.

An effect is that pose transformation data between two digital cameras having non-coincident fields of view can be calculated using a simple calibration standard (such as a planar chequerboard pattern).

According to an embodiment of the first aspect, there is further provided obtaining the first and second pluralities of images using the first calibration object, wherein a device comprising the first and second digital cameras is azimuthally realigned relative to the first calibration object in-between obtaining the first and second pluralities of images.

An effect is that a simple calibration rig comprising one calibration object can be used to calibrate two digital cameras on obverse sides of a smartphone, for example. This means that the calibration rig can be smaller.

According to an embodiment of the first aspect, determining first pose data further comprises:

obtaining an entire image of the first calibration object using the first digital camera when located at a first test position on the linear orthogonal axis;

calculating the location of the first calibration object in the reference frame of the first digital camera using the first calibration data.

An effect is that because a frame of reference of the first calibration object is linked by a known relationship to a frame of reference of the calibration rig, an unknown relationship between the pose of the first digital camera and the frame of reference of the calibration rig may be calculated.

According to an embodiment of the first aspect, there is further provided:

generating a reference transformation between the first and/or the second digital camera and a reference point on a device comprising the first and second digital cameras by:

calculating a first reference transformation based upon the first pose data, the reference frame of the first calibration object, and a reference point of a calibration rig to which the device is mechanically secured, calculating a second reference transformation based upon the second pose data, the reference frame of the second calibration object, and the reference point of the calibration rig to which the device is mechanically secured; and combining the first and/or second reference transformations, or a weighted combination of the first and second reference transformations, to yield a device interface transformation.

An effect is that the pose of the camera relative to the interface can be calculated, enabling the attachment of surgical instruments to a surgical device.

According to an embodiment of the first aspect, there is further provided:

generating an accuracy metric of the pose transformation data;

if the accuracy metric of the pose transformation data does not meet a threshold, re-acquiring the first and/or second pluralities of the first and/or second calibration objects and repeating the calculation of the pose transformation data.

An effect is that the pose transformation data is obtained to a level of accuracy that is at least sufficient for a surgical intervention.

According to an embodiment of the first aspect, there is further provided outputting the pose transformation data.

An effect is that application software on a smartphone comprising first and second digital cameras can utilise the output pose transformation data to improve the accuracy of applications using the first and second digital cameras.

According to a second aspect, there is provided a device for generating pose transformation data between first and second rigidly mounted digital cameras having non-coincident fields of view, comprising:
an input unit; and
a processing unit.

The input unit is configured to obtain, from a first digital camera, a first plurality of images of a first calibration object in a frame of reference of a first calibration object indexed to a corresponding first plurality of measured linear displacement data of the distance between the first digital camera and the first calibration object. The input unit is configured to obtain, from the second digital camera, a second plurality of images of the first or a second calibration object in the frame of reference of the respective first or second calibration objects indexed to a corresponding second plurality of measured linear displacement data of the distance between the second digital camera and the first or the second calibration object.

The processing unit is configured to generate first and second object point data based, respectively, on the first and second pluralities of images and their respective measured linear displacement data, and a prior specification of the first and/or second calibration objects, to generate first and second calibration data of the first and second digital cameras based, respectively, on the first and second object point data, to determine first pose data between a first frame of reference of the first digital camera and the frame of reference of the first calibration object using the first calibration data, to determine second pose data between the frame of reference of the second digital camera and the frame of reference of the first or second calibration objects using the second calibration data, and to calculate the pose transformation data between the pose of the first digital camera and the pose of the second digital camera as a function of the first and second pose data.

According to a third aspect, there is provided calibration rig for generating pose transformation data between first and second rigidly mounted digital cameras having non-coincident fields of view, comprising:
a first calibration object having a frame of reference related to the frame of reference of the calibration rig; and
a linearly repositionable shuttle in the frame of reference of the calibration rig configured to rigidly support a device comprising first and second rigidly mounted digital cameras at a known position on a linear orthogonal axis with respect to the first calibration object, wherein the shuttle and/or the first calibration object are configured to be repositionable relative to each other along the linear orthogonal axis.

In use, the first rigidly mounted digital camera of the device has a first frame of reference, and wherein the second rigidly mounted digital camera of the supported device has a second frame of reference. One of the first and/or second digital cameras are used to obtain an image of the first calibration object at the known position from the respective first and/or second frames of reference.

An effect of this is that a test rig is provided enabling a reduction in the complexity of the calibration of a geometric relationship between first and second digital cameras having non-coincident fields of view for example, a smartphone. In particular, a homography algorithm can be restricted to a single dimension (the measured linear displacement of the smartphone relative to first and/or second calibration targets).

According to an embodiment of the third aspect, the shuttle further comprises a turntable enabling the device comprising first and second rigidly mounted digital cameras to be realigned azimuthally through substantially 180 degrees with respect to the first calibration object.

An effect is that a reduced complexity calibration rig can be provided having one calibration target as opposed to calibration targets.

According to an embodiment of the third aspect, a plurality of calibrated stations are provided at known positions on the shuttle's linear orthogonal axis for positioning the shuttle in accurately preset positions.

An effect is that a smartphone can be positioned on the calibration rig at preset points, and application software running, for example, on the smartphone can be advised that the smartphone is currently positioned at a fixed calibrated station on the linear orthogonal axis. In this case, the calibration rig can omit linear displacement measurement electronics (for example, a linear encoder).

According to an embodiment of the third aspect, the calibration rig further comprises,
a second calibration object having a second frame of reference related to the frame of reference of the calibration rig and positioned on the linear orthogonal axis opposite to the first calibration object. The shuttle is configured to move along the linear orthogonal axis in between the first and second calibration objects, and/or the first and second calibration objects are rigidly attached to each other and are configured to move along the linear orthogonal axis relative to the shuttle.

According to an embodiment of the third aspect, the calibration rig further comprises:
interface electronics.

The interface electronics is configured to at least obtain a measurement of the displacement of the shuttle relative to the first calibration object when one of the first and/or second digital cameras are used to obtain an image of the first calibration object from the respective first and/or second frames of reference.

An effect that accurate calibration measurements for use by, for example, a homography algorithm can be automatically provided.

According to an embodiment of the third aspect, the calibration rig further comprises
a displacement measurement device operably coupled to the interface electronics and configured to provide displacement data of the shuttle along the linear orthogonal axis relative to the first and/or second calibration object to the control electronics.

An effect that accurate calibration measurements for use by, for example, a homography algorithm can be automatically provided.

According to an embodiment of the third aspect, the calibration rig further comprises
a laterally translatable device mount operably coupled to the interface electronics and configured to laterally translate the position of the device relative to the linear orthogonal axis.

According to an embodiment of the third aspect, the calibration rig further comprises
a motion actuator operably coupled to the interface electronics and configured to translate the position of the shuttle relative to the first and/or second calibration objects along the linear orthogonal axis, and/or to translate the first and/or second calibration objects relative to the shuttle along the linear orthogonal axis.

An effect is that the calibration can be performed without human intervention.

According to fourth aspect, there is provided a system for generating pose transformation data between first and second rigidly mounted digital cameras having non-coincident fields of view, comprising a calibration rig as defined according to the third aspect, and a mobile computing device comprising first and second rigidly mounted digital cameras having non-coincident fields of view, wherein the mobile computing device is operably connected to the interface electronics of the calibration rig.

According to an embodiment of the fourth aspect, there is further provided a computer, wherein the computer is configured to perform the method according to the first aspect using the calibration rig of the third aspect.

According to an embodiment of the fourth aspect, a mobile computing device is configured to perform the method according to the first aspect using the calibration rig of the third aspect.

According to a fifth aspect, there is provided a computer program element comprising machine-readable instructions which, when executed using a processor, perform the computer-implemented method to the first aspect.

According to a sixth aspect, there is provided a non-transitory program storage medium comprising the computer program element according to the fifth aspect.

According to a seventh aspect, there is provided a mobile computing device comprising the computer program element according to the sixth aspect.

Definitions

In this section, definitions for specific terminology used in this disclosure are offered which also form part of the present disclosure.

Computer Implemented Method

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital light box. An example of such a digital light box is Buzz®, a product of Brainlab AG. The monitor may also be the monitor of a portable, for example handheld, device such as a smartphone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein. Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

Acquiring Data

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like. Accordingly, data can be acquired by a first and/or second digital camera of a smartphone, and presented to the smartphone's processor for further image processing operations, for example. Distance displacement data can be acquired by a smartphone by a distance measurement sensor via a serial data interface of the smartphone (for example the smartphone's USB interface, for example).

Registering

The n-dimensional image of a body is registered when the spatial location of each point of an actual object within a space, for example a body part in an operating theatre, is assigned an image data point of an image (CT, MR, etc.) stored in a navigation system.

Image Registration

Image registration is the process of transforming different sets of data into one coordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

Marker

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

Marker Device

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object. Determining this relative position is also referred to as registering the marker device and the object. The marker device or the object can be tracked, which means that the position of the marker device or the object is ascertained twice or more over time.

Imaging Geometry

The information on the imaging geometry preferably comprises information which allows the analysis image (x-ray image) to be calculated, given a known relative position between the imaging geometry analysis apparatus and the analysis object (anatomical body part) to be analysed by x-ray radiation, if the analysis object which is to be analysed is known, wherein "known" means that the spatial geometry (size and shape) of the analysis object is known. This means for example that three-dimensional, "spatially resolved" information concerning the interaction between the analysis object (anatomical body part) and the analysis radiation (x-ray radiation) is known, wherein "interaction" means for example that the analysis radiation is blocked or partially or completely allowed to pass by the analysis object. The location and in particular orientation of the imaging geometry is for example defined by the position of the x-ray device, for example by the position of the x-ray source and the x-ray detector and/or for example by the position of the multiplicity (manifold) of x-ray beams which pass through the analysis object and are detected by the x-ray detector. The imaging geometry for example describes the position (i.e. the location and in particular the orientation) and the shape (for example, a conical shape exhibiting a specific angle of inclination) of said multiplicity (manifold). The position can for example be represented by the position of an x-ray beam which passes through the centre of said multiplicity or by the position of a geometric object (such as a truncated cone) which represents the multiplicity (manifold) of x-ray beams. Information concerning the above-mentioned interaction is preferably known in three dimensions, for example from a three-dimensional CT, and describes the interaction in a spatially resolved way for points and/or regions of the analysis object, for example for all of the points and/or regions of the analysis object. Knowledge of the imaging geometry for example allows the location of a source of the radiation (for example, an x-ray source) to be calculated relative to an image plane (for example, the plane of an x-ray detector). With respect to the connection between three-dimensional analysis objects and two-dimensional analysis images as defined by the imaging geometry, reference is made for example to the following publications:

1. "An Efficient and Accurate Camera Calibration Technique for 3D Machine Vision", Roger Y. Tsai, Proceedings of the IEEE Conference on Computer Vision and Pattern Recognition. Miami Beach, Fla., 1986, pages 364-374
2. "A Versatile Camera Calibration Technique for High-Accuracy 3D Machine Vision Metrology Using Off-the-Shelf TV Cameras and Lenses", Roger Y. Tsai, IEEE Journal of Robotics and Automation, Volume RA-3, No. 4, August 1987, pages 323-344.
3. "Fluoroscopic X-ray Image Processing and Registration for Computer-Aided Orthopedic Surgery", Ziv Yaniv
4. EP 08 156 293.6
5. U.S. 61/054,187

Referencing

Determining the position is referred to as referencing if it implies informing a navigation system of said position in a reference system of the navigation system.

Mapping

Mapping describes a transformation (for example, linear transformation) of an element (for example, a pixel or voxel), for example the position of an element, of a first data set in a first coordinate system to an element (for example, a pixel or voxel), for example the position of an element, of a second data set in a second coordinate system (which may have a basis which is different from the basis of the first coordinate system). In one embodiment, the mapping is determined by comparing (for example, matching) the colour values (for example grey values) of the respective elements by means of an elastic or rigid fusion algorithm. The mapping is embodied for example by a transformation matrix (such as a matrix defining an affine transformation).

Elastic Fusion, Image Fusion/Morphing, Rigid

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are for example vectors of a deformation field. These vectors are determined by the optimisation algorithm in such a way as to result in an optimum degree of similarity. Thus, the optimum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors is preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, such as a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

Fixed (Relative) Position

A fixed position, which is also referred to as fixed relative position, in this document means that two objects which are in a fixed position have a relative position which does not change unless this change is explicitly and intentionally initiated. A fixed position is in particular given if a force or torque above a predetermined threshold has to be applied in order to change the position. This threshold might be 10 N or 10 Nm. In particular, the position of a sensor device remains fixed relative to a target while the target is registered or two targets are moved relative to each other. A fixed position can for example be achieved by rigidly attaching one object to another. The spatial location, which is a part of the position, can in particular be described just by a distance (between two objects) or just by the direction of a vector (which links two objects). The alignment, which is another part of the position, can in particular be described by just the relative angle of orientation (between the two objects).

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures.

DESCRIPTION OF EMBODIMENTS

Surgical equipment is gradually being supplemented with electronics and sensors to improve the accuracy of the equipment and to aid a medical professional when using such equipment.

Figure 1:
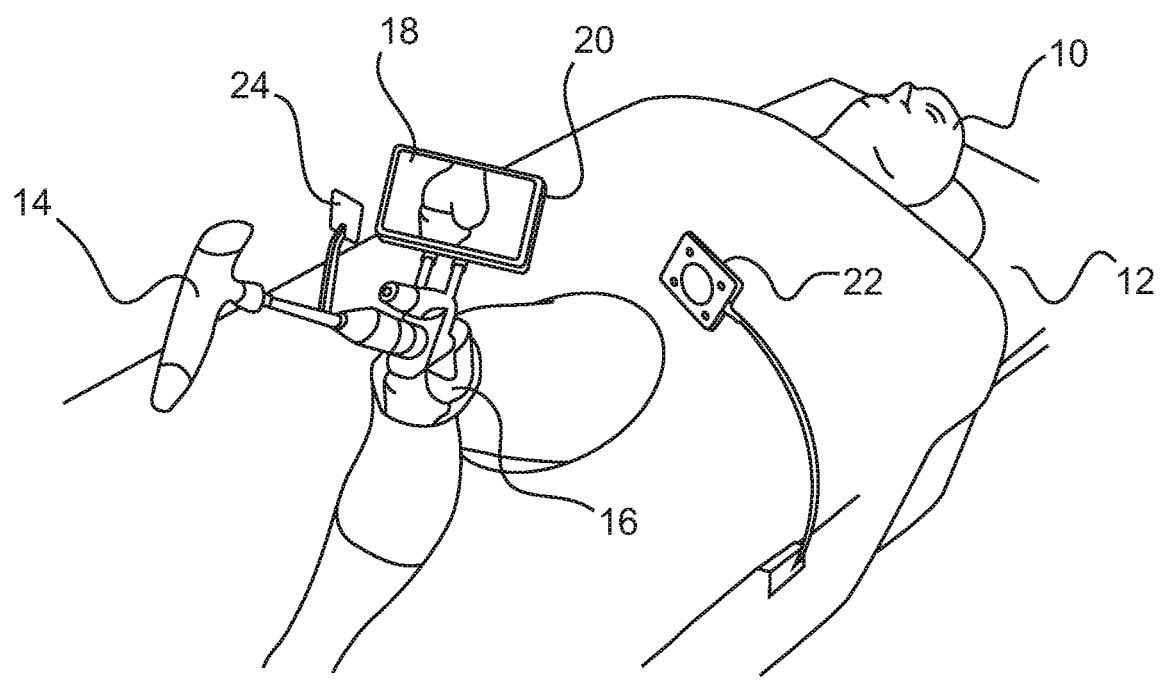
FIG. 1 illustrates a proposed use of a smartphone incorporating a plurality of digital cameras having non-coincident views during a surgical procedure.

FIG. 1 illustrates an example of a surgical process utilising a surgical instrument having a digitally augmented bone saw guide 14 (cutting block) comprising a smartphone holder. In particular, a patient 10 is lying on a patient support 12 about to undergo a knee replacement operation. A bone saw guide 14 has been anchored to the end of the femur 16, to enable a bone saw to cut through bone at an accurate orientation. A commodity smartphone 18, for example, is held in a rigid relationship to the cutting guide 14 using a rigid plastic holder 20, for example. The smartphone 18 is positioned in the rigid plastic holder 20 so that a camera located on the face of the smartphone not having a screen (having a field of view away from the user in use, or the "rear" camera) of the smartphone (not illustrated, conventionally used for general-purpose photography or video capture) has a field of view along the patient's femur.

A front-facing camera of the smartphone (not illustrated, conventionally used for "Webcam" functionality of the smartphone) has a field-of-view in the opposite direction to the direction of the patient's femur.

Accordingly, the rear-facing camera and the front-facing camera of the smartphone 18 have non-coincident fields view. In use, in a typical medical procedure, the rear-facing camera of the smartphone 18 includes in its field of view a first marker 22. The front facing camera includes in its field of view a second marker 24. As one example application, the display of the smartphone 18 may contain "guidelines" showing the deviation in alignment of the cutting guide 14 from an optimal alignment defined in a pre-surgical protocol, for example. For this be possible, the smartphone 18 should be accurately located within the frame of reference of the patient. Accordingly, the smartphone application 18 for digitally augmented surgery uses the first 22 and/or second 24 marker to accurately locate the smartphone 18 within the patient frame of reference, for example.

Digitally augmented surgery should be carried out a high degree of accuracy (on the sub-millimetre scale). However, the intrinsic and extrinsic camera parameters of the front-facing camera and the rear facing camera of the smartphone 18 might not be known as accurately. A smartphone is an item of commodity electronics using inexpensive camera components and typically a wide degree of variation of the intrinsic and extrinsic camera parameters is observed. For example, the pose of the front and/or rear facing camera may be unpredictable between different smartphones owing to variances in mounting angles of the cameras. Accordingly, to provide a degree of accuracy on the sub-millimetre scale, the digitally augmented surgery software executed by the smartphone 18 must be calibrated to the specific intrinsic and extrinsic characteristics of the front and rear facing cameras comprised in the smartphone 18. Of course, although the preceding and following description refers to a smartphone 18, will be appreciated that many types of device having front and rear facing digital cameras with non-coincident fields of view can be used for augmented surgery, and will also require calibration.

Accordingly, the present application concerns how to calibrate at least the rear and front-facing cameras of a smartphone so that they can be used as a tracking system for surgical navigation software applications. The technique proposes to calculate individual camera calibration parameters of the front and rear cameras ("single camera calibration") and then to determine the spatial relationship of the front and rear cameras to each other ("multi-camera calibration"). This enables the establishment of a common coordinate system in a merged working volume.

Previously, single camera calibration has been performed as described, for example, in U.S. Pat. No. 6,437,823 B1 (Zhang) using a planar calibration target. This method requires a calibration pattern to be imaged in many non-parallel orientations. The non-parallel images of the calibration pattern are processed using a homography-based algorithm. However, this approach proposes the observation of a calibration pattern from different viewing angles requiring complex motion of the pattern and/or the camera. This is stated in Zhang to be necessary for the generation of depth information to calculate the intrinsic camera parameters (such as focal length and principle point).

Accurately positioning the calibration target at different angles leads to a complicated calibration rig. Multi-camera calibration methods have been discussed (see "Calibration of a multi-camera rig from non-overlapping views" by S. Esquivel et. al"). However, these approaches are very complex because they are designed to work without dedicated calibration patterns. Features are extracted from all structures visible in the images. These techniques also require images from at least two different positions of the camera system in order to detect the trajectory of the camera system.

According to a third aspect, there is provided a calibration rig 30a, 30b for generating pose transformation data between first 32a, 32b and second 34a, 34b rigidly mounted digital cameras of a smartphone 18 having non-coincident fields of view 36a, 38a, 36b, 38b.

Figure 2:
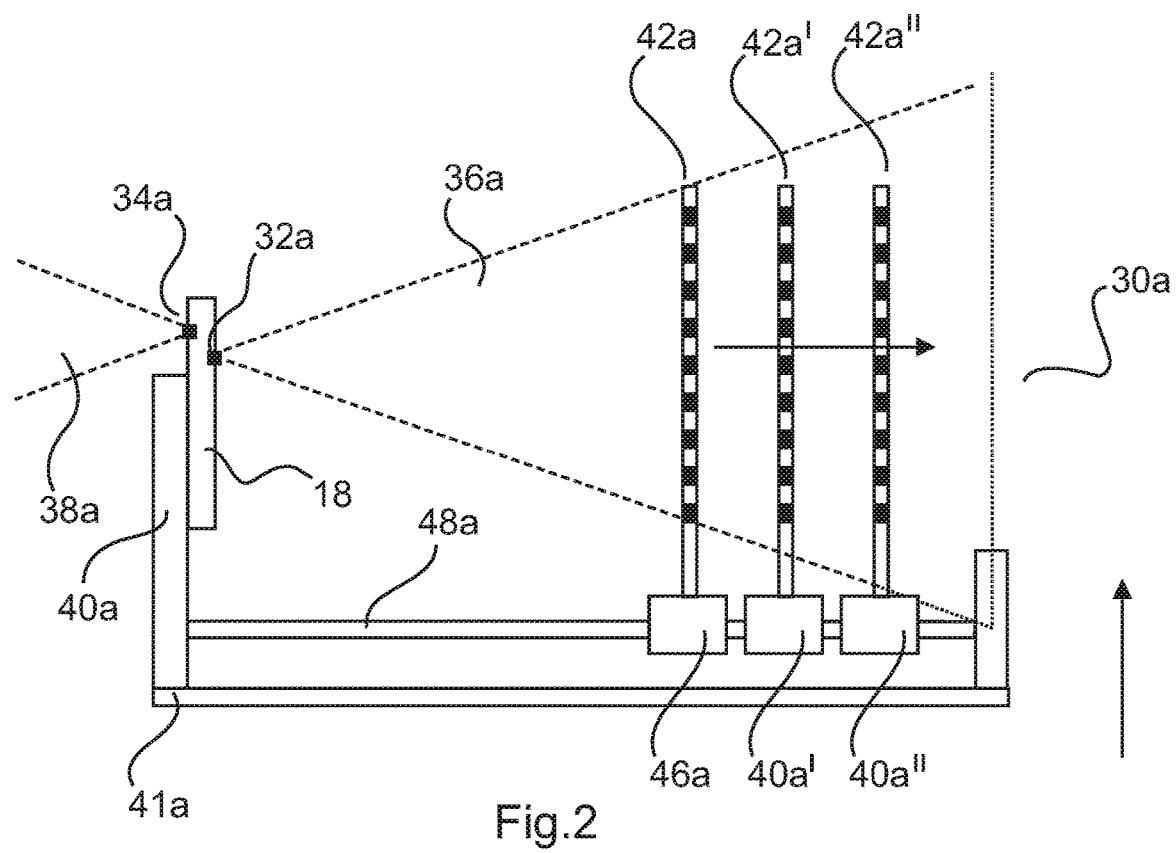
FIG. 2 schematically illustrates a side cut-through view of a "single-ended" linear calibration rig according to an example of third aspect, used in combination with a smartphone as part of a system according to an example of the fourth aspect.

FIG. 2 schematically illustrates a side cut-through view of a "single-ended" linear calibration rig according to an example of third aspect, used in combination with a smartphone as part of a system according to an example of the fourth aspect.

Figure 3:
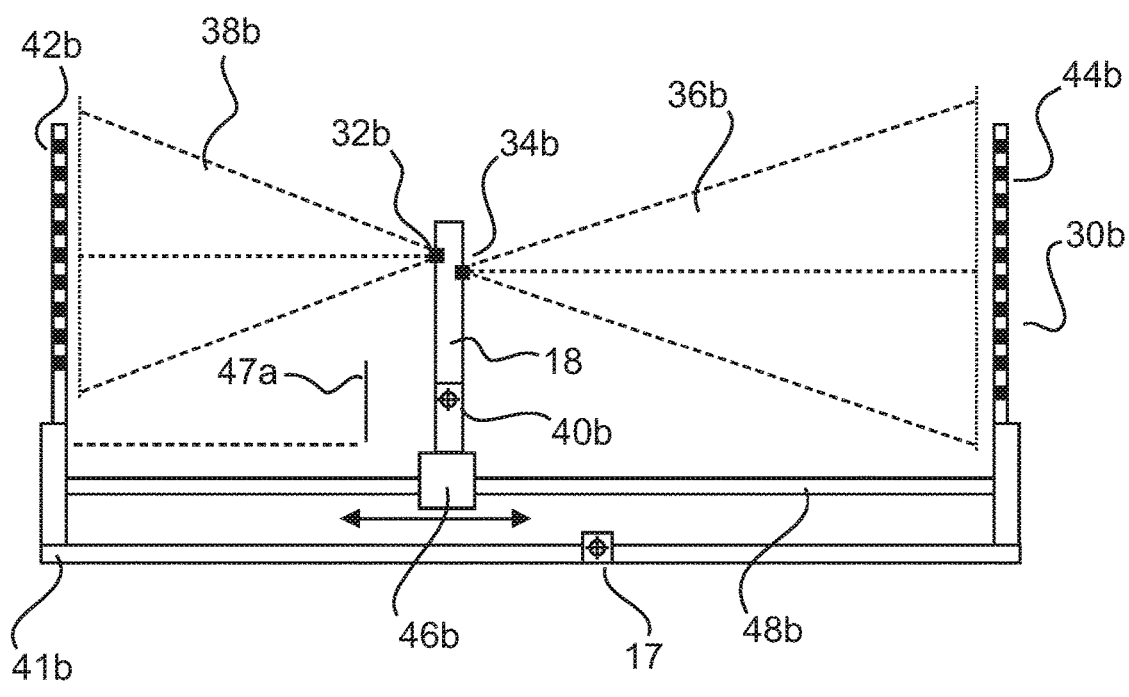
FIG. 3 schematically illustrates a side cut-through view of a "double-ended" linear calibration rig according to another an example of third aspect, used in combination with a smartphone as part of an example system according to an example of the fourth aspect.

FIG. 3 schematically illustrates a side cut-through view of a "double-ended" linear calibration rig according to another an example of third aspect, used in combination with a smartphone as part of a system according to an example of the fourth aspect.

As will be explained subsequently, the "single-ended" and "double-ended" linear calibration rigs both enable successive images of a calibration target to be obtained by first 32a, 32b and second 34a, 34b cameras of a smartphone 18. The "double-ended" version of the calibration rig 30b enables successive images of first 42b and second 44b calibration targets to be obtained by the first 32b and second 34b cameras simultaneously, without rotating the smartphone 18 in its holder 40b. The "single-ended" version of the calibration rig 30a enables successive images of a single calibration target 42a to be obtained at different linear separations to the calibration target, however the smartphone 18 need to be repositioned, or rotated, in its holder 40a to enable both the first 32a and second 34a cameras to be calibrated. Turning again to FIG. 3, there is provided a first calibration object 42b having a frame of reference related to the frame of reference of the calibration rig because the first calibration object 42b is rigidly mounted to a base support 41b of the calibration rig. The calibration rig 30b further comprises a linearly repositionable shuttle 46b in the frame of reference of the calibration rig configured to rigidly support a device (such as smartphone 18) comprising first 32b and second 34b rigidly mounted digital cameras at a known position on a linear orthogonal axis 48b with respect to the first calibration object 42b, wherein the shuttle 46b and/or the first calibration object 42b are configured to be repositionable relative to each other along the linear orthogonal axis 48b.

In use, the first rigidly mounted digital camera 32b of the smartphone 18 has a first frame of reference, and the second 34b rigidly mounted digital camera of the smartphone 18 has a second frame of reference (owing to manufacturing variations of the smartphone 18, for example). In the example of FIG. 3, the first 32b digital camera is used to obtain a first image of the first calibration object 42b at a first known position from the respective first and/or second frames of reference. The second 34b digital camera is used to obtain a second image of the second calibration object 44b.

The shuttle 46b is subsequently relocated on the linear orthogonal axis 48b and a third image of the first calibration object 42b is obtained by the first 32b digital camera at the second location of the shuttle 46b. A fourth image of the second calibration object 44b is obtained using the second 34b digital camera at the second location of the shuttle 46b. The steps may be repeated several times to simultaneously obtain a first plurality of images of the first calibration object 42b and a second plurality of images of the second calibration object 44b at known positions of the shuttle 46b. It is not essential that the images of the first and second pluralities of images are obtained simultaneously.

Optionally, in the first aspect, obtaining, using the first digital camera, a first plurality of images further comprises positioning the first digital camera at a first axial position on a calibration rig, measuring a first linear orthogonal axial displacement of the first digital camera relative to the first calibration object, obtaining a first image of the first calibration target at the first linear orthogonal axial displacement, repositioning the first digital camera into a second axial position on the calibration rig having a second linear orthogonal axial displacement relative to the first calibration object, obtaining a second image of the first calibration target at the second linear orthogonal axial displacement.

Optionally, in the first aspect a first image of the first plurality of images of the first calibration object is obtained at an initial calibration position wherein the first linear orthogonal axial displacement is the smallest distance between the first digital camera and the first calibration object enabling the first calibration object to be entirely visible using the first digital camera.

Optionally, in the first aspect determining the first and/or second pose data is based on the relative position and orientation of the first and second calibration objects.

Turning to FIG. 2, an alternative calibration rig 30a according to the third aspect is shown wherein the smartphone 18 remains stationary and attached to a holder 40a. Instead, a shuttle 46a comprising a calibration target 42a may be moved laterally on a linear support along the linear orthogonal axis 48a to thus increase and decrease a linear orthogonal distance between the calibration target 42a and the smartphone 18a.

Alternatively, the smartphone 18 may be supported on the shuttle 46a and the calibration target 42a may be stationary and positioned on holder 40a.

Another alternative of both the first and second calibration rig examples are shown in FIGS. 2 and 3 provide a smartphone 18 supported on a shuttle 46a, 46b and first 42a, 42b and/or second calibration targets 44a, 44b supported on second and third shuttles respectively. In this case, the linear orthogonal distance between the smartphone 18 and the first 42a, 42b and/or second calibration targets 44a, 44b may be varied by moving both the smartphone 18 and the calibration targets.

The "single-ended" and "double-ended" embodiments of the calibration rig of the third aspect can be fabricated from a wide range of materials provided such materials can provide a degree of rigidity of the calibration rig suitable for sub-millimetre measurements. For example, the calibration rig may be comprised of plastics such as polycarbonate, and/or metals such as hardened steel. The frame of the calibration rig may be integrally formed, or may comprise individual material sections that have been glued or bolted together.

Optionally, in a "single-ended" embodiment (not illustrated) of the aspect the shuttle 46a is configured to carry the smartphone 18, and the shuttle 46a further comprises a turntable (not illustrated) enabling the smartphone 18 device comprising first 34a and second 32a rigidly mounted digital cameras to be realigned azimuthally through substantially 180 degrees with respect to a first calibration object. Accordingly, a "single-ended" calibration rig is provided that enables the smartphone 18 to be accurately repositioned in the shuttle 46a.

Optionally, the "single-ended" 30a or "double-ended" 30b calibration rig comprises a plurality of calibrated stations (not shown) on the shuttle's linear orthogonal axis 38a, 38b for positioning the shuttle in accurately preset positions. In combination with software operating on a smartphone 18 software application, or on a computer (not shown) connected to the smartphone, for example, a smartphone 18 and/or a shuttle 46a, 46b may be positioned at an accurate preset location in the calibration rig 30a, 30b according to instructions provided by the software application. Advantageously, this means that complicated and more expensive hardware for automatically moving the shuttle 46a, 46b and/or complicated hardware for measuring the position of the shuttle 46a, 46b such as a linear encoder may be omitted or significantly reduced, because accurate positioning of the shuttle 46a, 46b in the calibration rig necessary for obtaining the first and second plurality of images of the first 42a, 42b and/or second 44b calibration targets is achieved by a user positioning the smartphone 18 and/or a mobile version of the calibration targets 42a, 42b, 44b at the calibrated stations on the instruction of the software application.

Optionally, the "single-ended" 30a or "double-ended" 30b calibration rig comprises interface electronics (not shown). The interface electronics is configured to at least obtain a measurement of the displacement of the shuttle 46a, 46b relative to the first calibration object when one of the first 32a, 32b and/or second 34a, 34b digital cameras are used to obtain an image of at least the first calibration object 42a, 42b from the respective first and/or second frames of reference.

For example, the interface electronics may comprise distance (displacement) measurement means such as a linear encoder included in the shuttle 46a, 46b capable of reading a scale attached to the a linear support along the linear orthogonal axis 48a. Such linear encoders can be provided with micron-scale accuracy, for example. Of course, a skilled person will appreciate that other analogous forms of distance measurement may be included in the interface electronics enabling the automatic detection of the linear distance between the first 32a, 32b and second 34a, 34b cameras and the first 42a, 42b and/or second 44b calibration targets.

Optionally, the interface electronics are communicatively connected to, for example, the data input and output interface of the smartphone 18 and/or a control computer.

In this way, accurate measured measurements of the linear distance between the first 32a, 32b and second 34a, 34b cameras and the first 42a, 42b and/or second 44b calibration targets can be automatically communicated to control software. In a case, as illustrated in FIG. 2, where the calibration target 42a is mounted on a movable shuttle 46a the position of the calibration target relative to the stationary smartphone 18 can be automatically communicated to control software.

Optionally the "single-ended" 30a or "double-ended" 30b calibration rig comprises a motion actuator (not shown) operably coupled to the interface electronics and configured to translate the position of the shuttle 46a, 46b relative to the first 42a, 42b and/or second calibration objects 44b along the linear orthogonal axis, and/or to translate the first and/or second calibration objects relative to the shuttle along the linear orthogonal axis 48a, 48b. For example, the motion actuator may move the shuttle comprising a calibration target 46a to a second position 42a' or a third position 42a".

The motion actuator may comprise, for example, a stepping motor (not shown) comprised within the shuttle 46a, 46b. Optionally, the motion actuator is provided as a rack and pinion arrangement. Optionally, the motion actuator is provided as a rotary screw arrangement (not shown) wherein a rotatable screw is provided along the linear orthogonal axis 48a, 48b with the shuttle 46a, 46b configured to move back and forth along the linear orthogonal axis 48a, 48b as the screws rotated. Optionally, a position control loop is provided taking as an input the measurement of the shuttle position using the measurement means. Therefore, the accuracy of the shuttle 46a, 46b can be more accurately positioned by exploiting the measured shuttle position signal. The skilled person will appreciate that various motion actuators may be provided capable of accurately moving the shuttle 46a, 46b and/or the calibration targets within the calibration rig.

Figure 4:
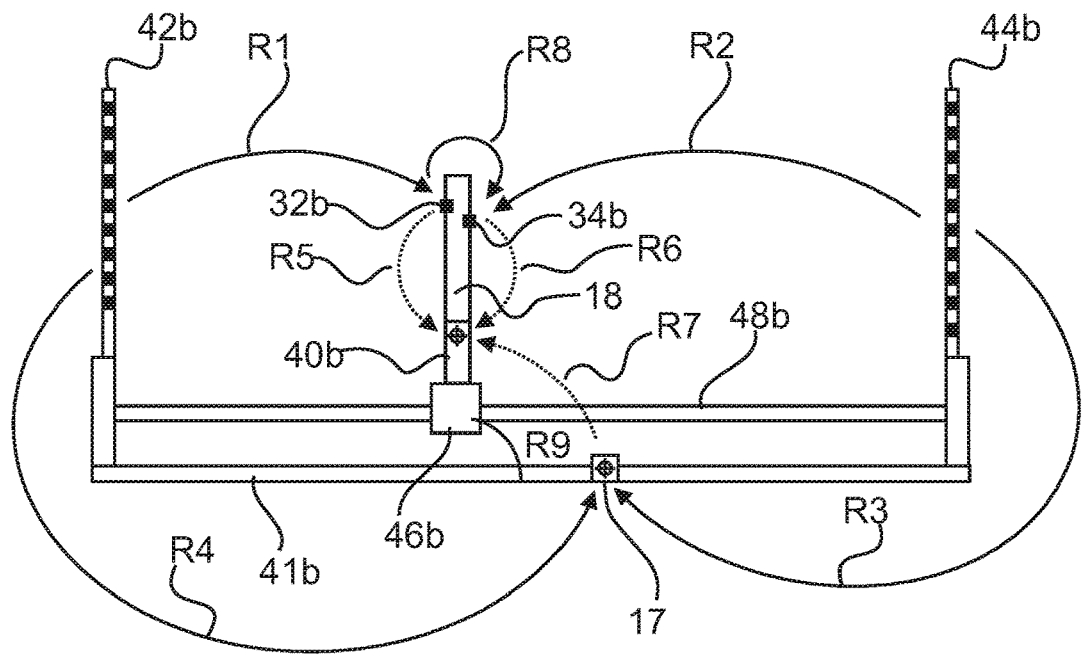
FIG. 4 schematically illustrates geometric relationships and transformations on a double-ended linear calibration rig according to an example of the third aspect.

FIG. 4 schematically illustrates geometric relationships and transformations on a double-ended linear calibration rig (as illustrated in FIG. 3, with reference numerals from FIG. 3 duplicated as appropriate) according to an example of the third aspect performing as a system according to the fourth aspect (with a smartphone 18 fitted onto shuttle 46b).

In particular, the first calibration object 42b has a known geometric relationship R4 to the base support of the calibration rig 41b (or any other frame part of the calibration rig). The second calibration object 44b has a known geometric relationship R3 to the base support of the calibration rig 41b (or any other frame part of the calibration rig). Shuttle 46b is mounted on linear orthogonal axis 48b. Provided the location of the shuttle 46b along the linear orthogonal axis 48b is known (for example, via a displacement measuring means or by the placement of the shuttle at specific predefined markers as previously described), a geometric relationship R9 between the shuttle 46b and the base support of the calibration rig 41b can be determined. The dimensions of the smartphone holder 40b (that has the function of supporting the smartphone 18 accurately in the shuttle 46b) are also known in advance.

Accordingly, the principal sources of uncertainty in the double calibration rig set up occur owing to variations in the pose of the first digital camera 32b with respect to the first calibration target 42b (the arc R1 in FIG. 4), and furthermore the pose of the second digital camera 34b with respect to the second calibration target 44b (the arc R2) in FIG. 4. Of course, determination of the relationship between the pose of the first digital camera 32b and the second digital camera 34b (denoted by the arc R8 in FIG. 4, the "pose transformation data" between first 32b and second 34b digital cameras of the smartphone 18) is one of the present aims of the technique described herein. It will be appreciated that the arc relationships R1-R9 can be validly described in any coordinate system and with reference to any individual component of the calibration rig. Furthermore, analogous relationships R1-R9 can be derived for a "single-ended version" of the calibration rig as discussed in relation to FIG. 2, for example.

In another example of the calibration system, two planar calibration patterns 42a, 42b, 44b are provided that are rigidly mounted on the calibration rig 30b, facing each other at a specified distance. Although in this application, it is assumed that the calibration targets are "chequerboard" patterns having a known prior specification, substantially any marker pattern could be used as a calibration pattern provided it is capable of being defined in using a prior specification. A device such as a smartphone 18 may be placed in between the patterns so that the fields of view 36a, 38a, 36b, 38b are approximately centred on the relevant calibration pattern. The smartphone 18 can move on a linear or substantially linear axis 48a 48b in order to vary the orthogonal distance between the first and/or second calibration patterns and the first and/or second digital cameras. A distance measurement sensor (not shown) provides a precise (for example, preferably to the nearest plus or minus 0.01 mm, or to 0.1 mm, 0.001 mm) in a linear distance on the axis of motion of the shuttle 46b or the smartphone 18 relative to the first and/or second calibration patterns as images of the first and/or second calibration patterns are obtained, for example. The images so acquired may be used in a single camera calibration process of the first and/or second digital cameras. The position of the first and/or second cameras relative to a common reference coordinate 40b may be located, to offer an interface for surgical instruments. Optionally, the entire procedure comprising image acquisition, linear axis motion, data transfer and computation of the calibration parameters is controlled by software, either on the smartphone 18 or an external computer.

Subsequently, a computer-implemented method 50 for generating pose Transformation data according to the first aspect will be discussed.

In generic terms, a camera calibration (also known as geometric camera calibration, or camera resectioning) yields the optical parameters of focal length ($f_x$, $f_y$), principal point (optical centre, $c_x$, $c_y$) and several lens distortion parameters. As such, camera calibration derives extrinsic, intrinsic, and distortion parameters of a camera. Generally, extrinsic parameters comprise a rotation and a translation of a camera from a "world" coordinate system or frame of reference to represent the rotation and translation of a given camera. For example, in the present application the "world" frame of reference may be considered to have an origin at the reference point 17 of the double-ended calibration rig, for example, although many other reference points could be used.

Thus, a camera calibration algorithm calculates a camera matrix of the first and second digital cameras, respectively, using intrinsic and extrinsic parameters. The extrinsic parameters of the first 32a, 32b and second 34a, 34b digital cameras can be thought of as a rigid transformation from the "world" (calibration rig) 3D frame of reference 17 to the first 32a, 32b or second 34a, 34b digital camera 3D frames of reference. The intrinsic parameters can be thought of as a projective transformations from the 3D frames of reference of the first 32a, 32b or second 34a, 34b digital cameras into 2D image coordinates of 2D images captured by the respective first 32a, 32b or second 34a, 34b digital cameras.

Thus, the present application proposes to estimate the camera parameters of the first 32a, 32b and second 34a, 34b digital cameras of an electronic device such as a smartphone 18 separately, relative to a fixed frame of reference of a calibration rig 17. Because first and second pose data (for example, extrinsic data) are both referenced R1, R2 to the common frame of reference 17 of a calibration rig, the pose transformation data R8 can be calculated as a function of the first and second pose data.

A skilled person will appreciate that many techniques can be applied to derive the first and second calibration data and/or the first and second pose data R1, R2. As an example, the present application uses the homography-based technique explained in U.S. Pat. No. 6,437,823 B1 (by Zhang, et al) to calibrate the first and second digital cameras separately.

Figure 5:
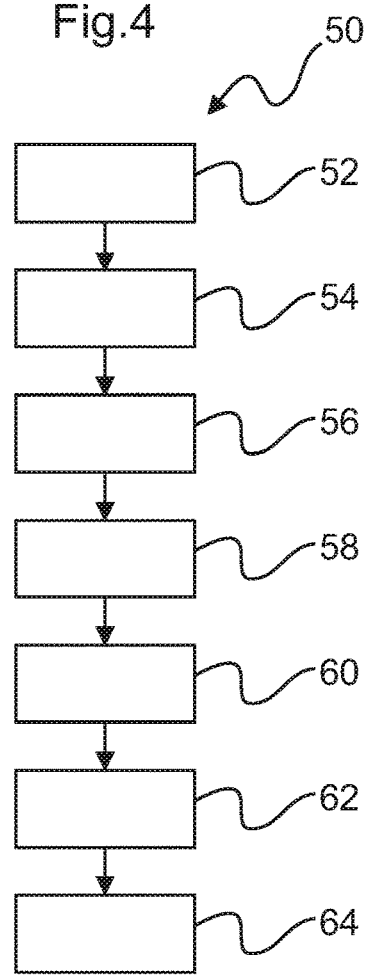
FIG. 5 schematically illustrates a computer-implemented method in accordance with the first aspect.

FIG. 5 schematically illustrates a computer-implemented method in accordance with a first aspect.

In particular, there is provided a computer-implemented method 50 for generating pose transformation data between first 32a, 32b and second 34a, 34b rigidly mounted digital cameras having non-coincident fields of view, comprising:

Obtaining 52, using the first digital camera 32a, 32b, a first plurality of images 68a, 68b of a first calibration object 42a, 42b in a frame of reference 17 of a first calibration object 42a, 42b indexed to a corresponding first plurality of measured linear displacement data of the distances $d_1$, $d_5$ between the first digital camera 32a, 32b and the first calibration object 42a, 42b.

Obtaining 54, using the second digital camera 34a, 34b, a second plurality of images 70a, 70b of the first 42a, 42b or a second 44a, 44b calibration object in the frame of reference 17 of the respective first 42a, 42b or second 44a, 44b calibration objects indexed to a corresponding second plurality of measured linear displacement data of the distances between the second digital camera 34a, 34b and the first 42a, 42b or the second 44a, 44b calibration objects.

Generating 56 first and second object point data 74 based, respectively, on the first 68a, 68b and second pluralities 70a, 70b of images and their respective measured linear displacement data, and a prior specification of the first and/or second calibration objects.

Generating 58 first and second calibration data of the first and second digital cameras based, respectively, on the first and second object point data.

Determining 60 first pose data R1 between a first frame of reference of the first digital camera and the frame of reference of the first calibration object using the first calibration data.

Determining 62 second pose data R2 between the frame of reference of the second digital camera and the frame of reference 17 of the first 42a, 42b or second 44a, 44b calibration objects using the second calibration data.

Calculating 64 the pose transformation data R8 between the pose R1 of the first digital camera 32a, 32b and the pose R2 of the second digital camera 34a, 34b as a function of the first and second pose data.

Single Camera Calibration

Generating 58 first calibration data of the first digital camera 32a, 32b comprises setting an initial calibration position 42a, for example, as the smallest distance between the first digital camera 32a 32b at which the pattern is entirely visible. It will be appreciated that dependent on the design of the calibration rig 30a or 30b, the calibration images for each digital camera may be obtained by moving either the position of the smartphone 18 (illustrated in FIG. 3), or the calibration target, or both. Provided a plurality of calibration images can be provided for each digital camera at an indexed distance which each show the complete extent of the calibration target, the order in which the images are collected is not important. Furthermore, it is not essential that the calibration images are obtained at equal distance separations (as illustrated), provided, for each acquisition, the distance between the digital camera and the calibration target has been accurately recorded or is known.

Obtaining an image of the calibration target in position 42a any closer to the fixed smartphone 18 position in the single-ended rig example of FIG. 2, for example would result in the calibration pattern being cropped, which reduces the number of pattern features that can be used for calibration, and potentially affects the calibration accuracy. Furthermore, means to identify the cropped portion of the calibration pattern out of the total calibration pattern would need to be provided). Alternatively, the starting position may be much further away from the smartphone, for example at 42a", and the mobile calibration target of FIG. 2 may be moved closer to the closest position 42a. Analogous concerns apply to the calibration rig of FIG. 3—for example, the line 47a shows a limit of how close the smartphone 18 can be to calibration target 42b when the smartphone 18 is moved on the shuttle 46b. In this case, a plurality of images of calibration target 42b using the first digital camera 32b is obtained by moving the shuttle backwards along the linear axis 48b from position 47a, for example.

Figure 6:
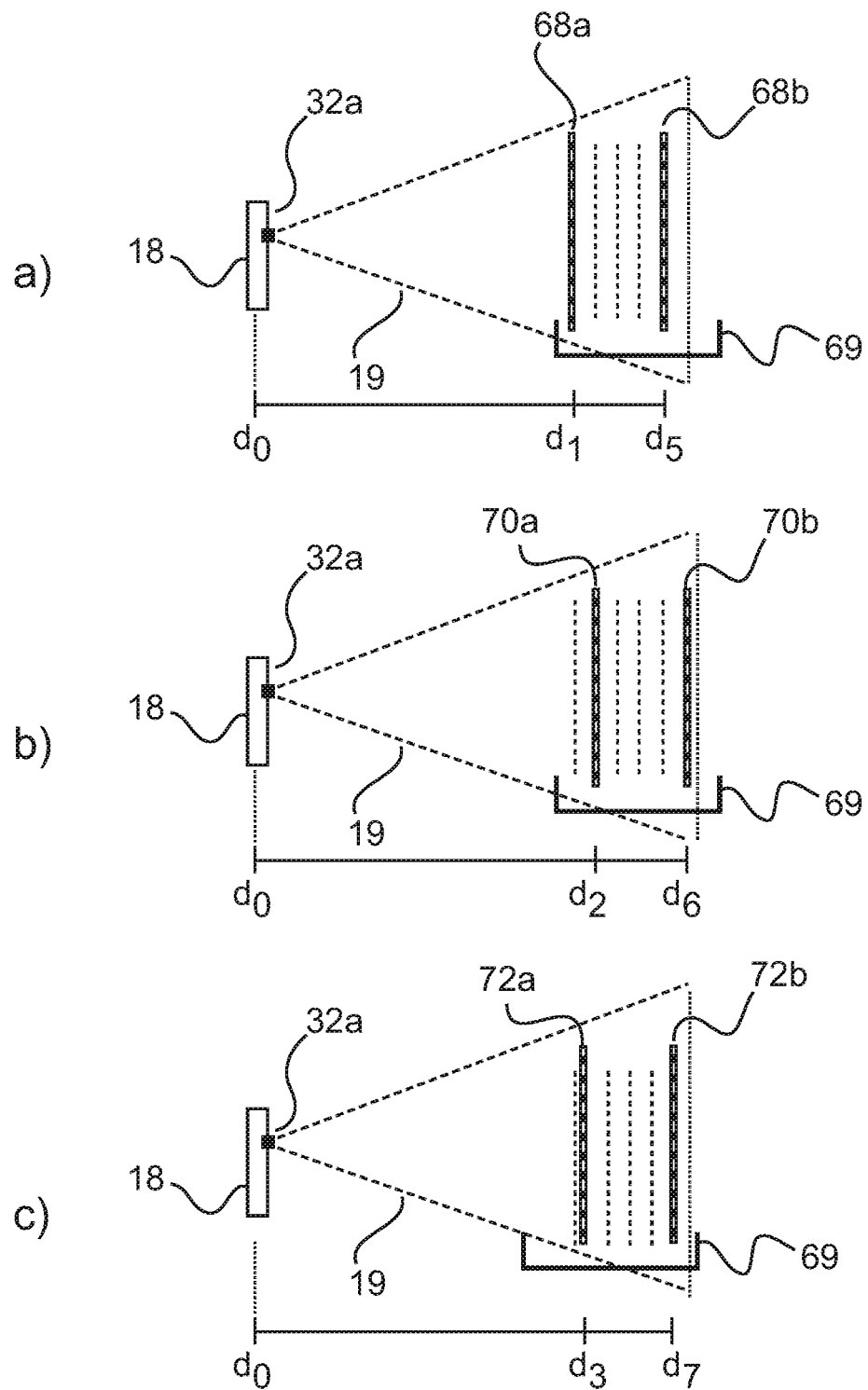
FIG. 6 schematically illustrates steps of an algorithm for generating a virtual 3D object from planar calibration pattern layers.

FIG. 6 further illustrates one example of the process of obtaining 52 a first plurality of images. For each camera 32a, 34a, 32b, 34b, an initial calibration position is defined as the smallest distance $d_1$ between the camera and the position 68a of the pattern where the pattern is entirely visible in the field of view 19 of the digital camera 32a. Starting from there, the distance d between the digital camera 32a and the calibration pattern is iteratively increased by a known step size to acquire a stack of images of the calibration pattern that are parallel to each other. In FIG. 6, the stack comprises seven images at distance separations from the datum of the first digital camera 32a position $d_0$ of $d_1$, $d_2$, $d_3$, $d_4$, $d_5$, $d_6$ $d_7$. At each iteration, an image 68a, 70a, 72a, 68b, 70b, 72b of the calibration target is acquired and indexed to a measured distance between the smartphone 18 (initial position) at do and the calibration target. Repetition enables the provision of a stack (plurality) of parallel calibration images 69.

FIG. 6a) shows the generation of a first virtual 3D point cloud using layers 68a and 68b of the plurality of images at view zero. FIG. 6b) shows the generation of second virtual 3D point cloud using layers 70a and 70b at view one. FIG. 6c) shows the generation of a third virtual 3D point cloud at view two using layers 72a, 72b of the plurality of images.

The process for obtaining a first plurality of images using the first camera 32a, 32b may be repeated using the second camera 34a, 34b for obtaining 54 a second plurality of images.

The next step in the individual camera calibration is the generation of first object point data is generated 56 from the first plurality of images. Feature points are extracted from each image 68a, 68b of the first calibration target 42a, 42b using a one or a variety of image processing algorithms known to a person skilled in the art. By comparing the extracted feature points to the pattern specification (prior specification) of the first calibration target 42, a set of object points corresponding to the feature points are generated. This results in corresponding sets of feature-point layers and object-point layers, where each object-point layer (and feature point layer) are associated (indexed) to a measured distance separation relative to the initial position (of the camera 32b and/or the calibration target 42b, as appropriate).

Figure 7:
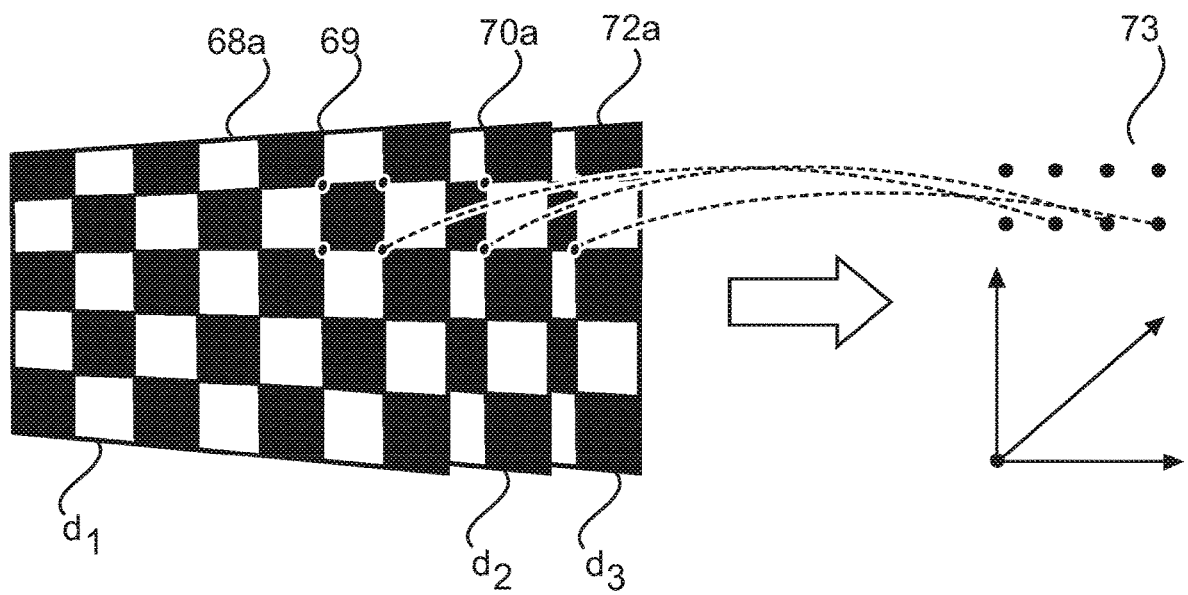
FIG. 7 schematically illustrates the generation of a 3D point cloud from planar calibration pattern layers.

FIG. 7 schematically illustrates the generation of a 3D point cloud from planar calibration pattern layers. Three stacked isometric representations of image data 68a, 70a, 72b from the same planar checkerboard-style calibration target are superimposed. Detection of a feature point corresponds to the detection of intersections of the chequered squares of images 68a, 70a, 72a, for example (illustrated by small dots). The distance information defining the acquisition distance between image data 68a, 70a, 72b is used to create groups of two or more layers to form a plurality of non-planar point clouds. Each point cloud 73 can be considered to be a view onto a virtual 3D calibration object having a thickness defined by the acquisition distance separation between the images of the plurality of images.

Once acquired, the sets of 3D object point clouds, together with their corresponding sets of feature points, can be provided as the input to a single-camera calibration algorithm using the homography approach of U.S. Pat. No. 6,437,823 B1, for example, that can determine the internal and external parameters of the first digital camera 32b. This procedure can be repeated for the second digital camera 34b of a smartphone, either using a duplicated calibration target (or a different calibration target of which a second prior specification is known). Alternatively, the smartphone 18 may be rotated in the azimuth plane (either using a turntable mechanism, or by removing the camera from a holder, rotating it, and replacing it in the holder) to enable the second digital camera 34b of the smartphone to acquire the calibration images from the same calibration target as used to obtain calibration images in respect of a first digital camera 32a.

Figure 8:
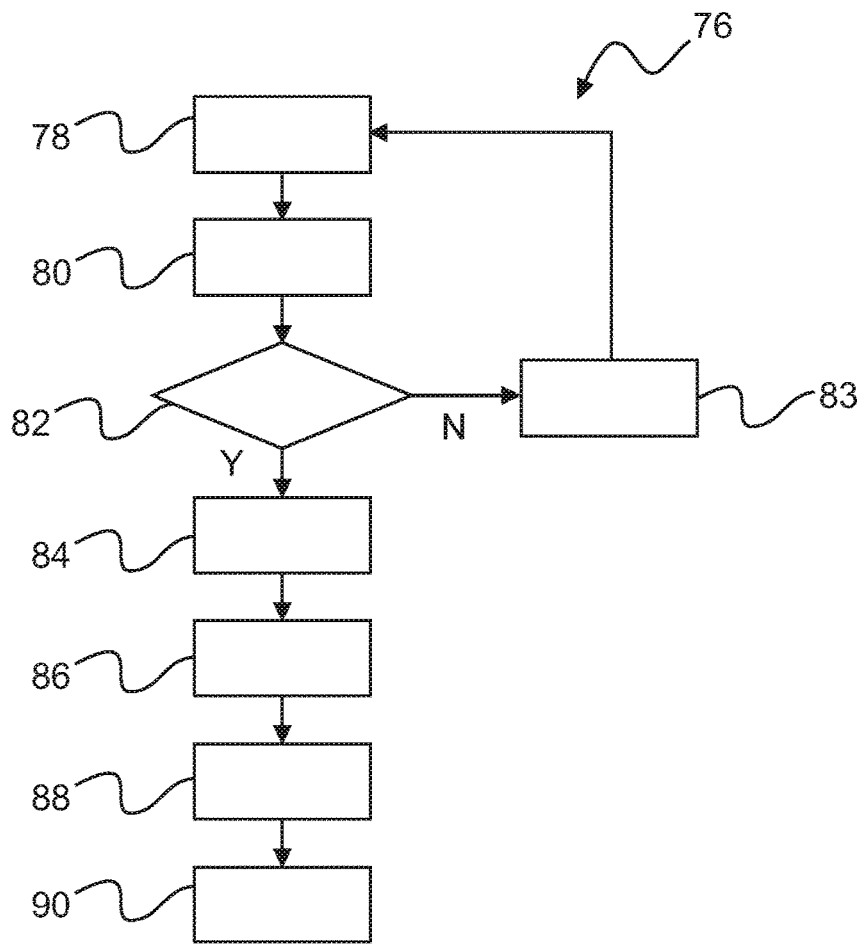
FIG. 8 schematically illustrates a method for generating calibration data of a digital camera.

FIG. 8 illustrates a single-camera calibration algorithm 76 according to an embodiment. The single-camera calibration algorithm 76 will now be described.

In step 78, an image of a calibration target (for example, a planar chequerboard) is acquired using a digital camera. The image may be acquired using either the main camera (rear camera) or videoconferencing camera (front camera) of the smartphone, for example. However it will be appreciated that the invention is not restricted to use with a smartphone and any electronic device having first and second digital cameras with non-constant fields of view could be used.

In step 80, the distance separation between the digital camera used to acquire the image in step 78 and the calibration target is measured and preferably stored as an index to the acquired image of the calibration target. The distance separation is, for example, the absolute distance between a camera and the calibration target. Optionally, it is sufficient to know the relative distances separating each of the acquisition positions. Preferably, the distance separation is measured along an axis that is orthogonal with respect to a planar calibration target and the digital camera. The distance separation may be measured, for example, using a linear encoder attached to a shuttle that moves the smartphone 18 along the axis. For example, a BCD code may be read off the calibration rig by the shuttle as it moves along the axis. Alternatively, the calibration rig may be provided with accurate fixed markers that the smartphone 18 is moved to as a preset. Software of the smartphone 18 is updated to confirm that a smartphone 18 is at a position of a given fixed marker. In this way, the smartphone knows its location (and therefore the distance separation) along the linear axis. Alternatively, the calibration rig may provide the calibration target on a moving shuttle capable of logging its location on the linear axis, and the smartphone 18 may be stationary, as illustrated in FIG. 2.

In step 82, a determination is made as to whether enough images of the calibration target have been acquired. Optionally, the determination is based on an arbitrary number of images of the calibration target, for example two, three, four, five, six, seven, eight, nine or ten images. Optionally, the determination is based on an iterated quality metric or sensitivity of the output camera calibration parameters (for example, as a rate of change of one or more of the calculated camera parameters falls to below a threshold indicating that the camera calibration parameters have each convergence). If it is determined that not enough images of the calibration target have been acquired, process flow continues to step 83. If it is determined that enough images of the calibration target have been acquired, the process flow continues to step 84.

In step 83, the distance separating the smartphone 18 and the calibration target is adjusted, either by moving the location of the smartphone 18, the location of the calibration target, or both. Optionally, the movement is manual (performed by user of the calibration rig) optionally, the movement is automatically performed by control software on a control computer and/or the smartphone 18 itself.

In step 84, layers of feature points are extracted from each image of the plurality of images obtained as a result of the iteration of the loop 78, 80, 82, 83. The extraction of feature points from a plurality of images of a chequerboard pattern is illustrated in FIG. 7 for example. A 2D filter may be applied to each image 68a, 70a, 72a of the plurality of images of the first calibration object to identify a feature point 69 at the intersection of two corners of the chequerboard pattern, for example.

In step 86, the extracted feature points of each image of the plurality of images of the first calibration object are used to generate object points, in object point layers each in planes that correspond to the location of the calibration object at the time the image of the plurality of images that was used to provide the object points in a particular layer were captured. Because the images 68*a*, 70*a*, 72*a* are captured at a measured distance separation, and because the characteristics (measurements) of the pattern of the first calibration object is known from a prior specification, a plurality of feature points are used to generate a corresponding plurality of object points.

In step 88, the object point layers are reordered and combined to form different views onto a virtual 3D calibration object (consisting of points extracted from the image of the 2D calibration object) according to FIGS. 6 and 7. In other words, a virtual 3D calibration object is generated using planar 2D images of a known 2D calibration object obtained having an accurately known separation.

In step 90, camera calibration parameters (for example, extrinsic parameters, intrinsic parameters and/or distortion parameters) of the first digital camera are calculated using the object points derived in previous steps.

Multi Camera Calibration

The method outlined herein assumes that the two calibration patterns (or one calibration pattern in a "single-ended" implementation) are attached to the system and that the position and orientation of each pattern relative to each other are known. As a pre-requisite, the method assumes that the calibration parameters of the first and second digital cameras have previously been calibrated to account for extrinsic, intrinsic, and/or distortion. Optionally, the homography-based single-camera calibration process as discussed in FIG. 8 is applied to perform the single camera calibrations.

The smartphone 18 is then positioned in between the patterns in a way that both cameras can see the entire pattern of their respective calibration patterns (in the "double-ended" version). At this position in the frame of reference of the calibration rig, each camera acquires an image of the respective calibration pattern. Then, the location of the pattern in the coordinate system (frame of reference) of the first or second digital cameras can be determined using the respective internal (intrinsic and distortion) calibration parameters of the first or second digital cameras obtained using the single-camera calibration processes. Because the pose of the first and second calibration patterns relative to each other is known (R3 and R4 in FIG. 4), the transformation R8 of FIG. 4 (the pose transformation data between the pose of the first digital camera and the pose of the second digital camera) can be determined. Optionally, if the quality of the pose transformation data is lower than a predefined threshold, the device can be brought into a new separation between the first and/or second calibration targets and the image acquisition can be repeated.

Optionally, if the exact transformation R7 between the calibration rig and the smartphone 18 is known, the spatial relation of the instrument interface of the smartphone 18 and the cameras of the smartphone 32*b*, 34*b* can be determined as a combination of the transformations R1, R4, R7 and R2, R3, R7.

Figure 9:
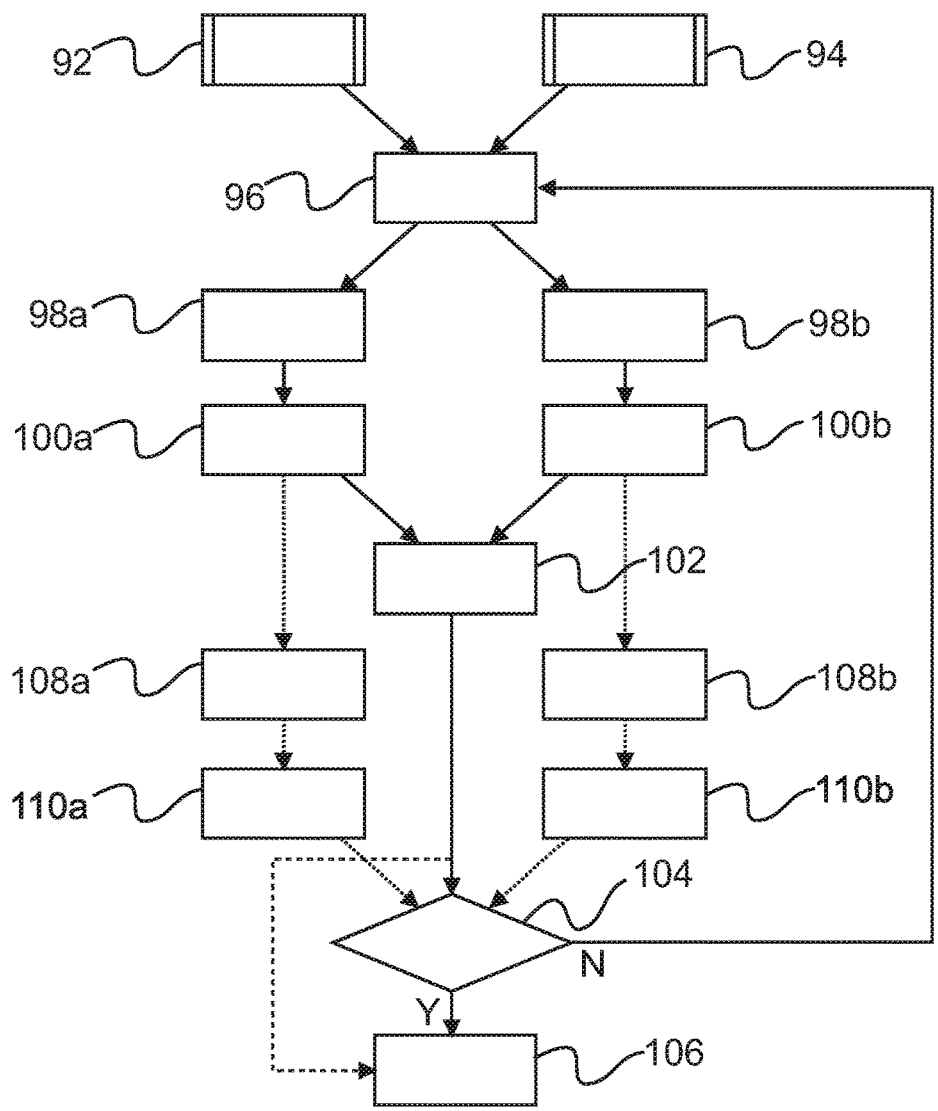
FIG. 9 schematically illustrates a computer-implemented method according to an example of the first aspect.

FIG. 9 schematically illustrates a computer-implemented method according to an example of the first aspect.

In step 92, a single-camera calibration process as described in FIG. 8 is performed for a first digital camera.

In step 94, a single-camera calibration process as described in FIG. 8 is performed for a second digital camera. It is not essential that respective images comprised in the first and second pluralities of images are obtained simultaneously, provided the images are indexed to a distance index separating them from the respective first or second calibration targets.

In step 96, the distance between a first and/or second calibration target and a smartphone 18 (or other device comprising two cameras having non-coincident fields of view) is adjusted by a known amount (by moving the smartphone 18, or by moving one or both of the calibration targets).

In step 98*a*, an image of a first calibration pattern is obtained using the first calibrated digital camera at a first known distance separation between the smartphone 18 and the first calibration target.

In step 98*b*, an image of the second calibration pattern is obtained using the second calibrated digital camera at a second known distance separation between the smartphone 18 and the second calibration target.

It will be appreciated that in a "double-ended" calibration rig as described in FIG. 3, steps 98*a* and 98*b* may be performed in parallel. Optionally, in a "single-ended" calibration rig as, for example, described in FIG. 2 steps 98*a* and 98*b* are performed serially. In a "single-ended" implementation, a smartphone 18 may obtain an image of a calibration pattern as step 98*a*, and can be rotated in the azimuth plane using a turntable or by removing and replacing the phone in a holder, for example. Then, the image of a calibration pattern in step 98*b* is obtained.

In step 100*a*, the transformation between the first calibration pattern and the first digital camera is obtained. In other words, first pose data R1 between a first frame of reference of the first digital camera and the frame of reference of the first calibration object is determined using the first calibration data.

In step 100*b*, the transformation between the second calibration pattern and the second digital camera is obtained. In other words, second pose data R2 between a frame of reference of the second digital camera and the frame of reference or second calibration objects using the second calibration data is obtained.

The single camera calibration process is applied individually to at least first and second cameras having non-coincident fields of view prior to determining pose transformation data between the first and the second cameras.

In step 102, the pose transformation data (in other words the spatial relationship R8 illustrated in FIG. 4 of the first camera 32*b* relative to a second camera 34*b* is generated using knowledge of the pose of the first camera 32*b* and the pose of the second camera 34*b*. In other words, a camera to camera coordinate transformation is calculated.

Optionally, the result of step 102 is provided as the pose transformation data R8, directly stored on a smartphone 18, for example, at step 106.

Optionally, the process flow continues to a threshold checking step 104 in which the accuracy of the pose transformation data is checked against an accuracy threshold. If the pose transformation data is not as accurate as a threshold requires, process flow runs back to step 96 and the multi-camera calibration process is repeated. If the pose transformation data is as accurate as the threshold requires, the process flow continues and the result is stored on a smartphone 18, for example, at step 106.

Steps 108*a*, 108*b* and 110*a*, 110*b* comprise determining the geometric relationship of an instrument interface 40*b* of a calibration rig to the smartphone 18.

Step 108*a* comprises optionally reading a current pose reference of a first digital camera to a first calibration pattern R1. Step 108b comprises optionally reading a current pose reference to a second calibration pattern R2.

Step 110a comprises optionally calculating the transformation R5 between the first digital Camera 32b and the instrument interface 40b. Step 110b comprises optionally calculating the transformation R6 between the second digital camera 34b and the instrument interface 40b.

Figure 10:
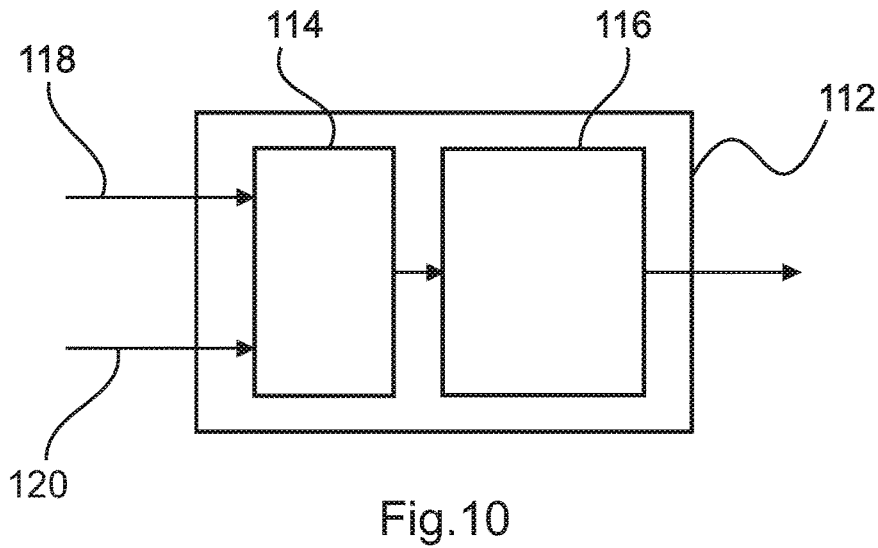
FIG. 10 schematically illustrates a device according to the second aspect.

FIG. 10 illustrates a device 112 according to a second aspect. The device comprises an input unit 114 and a processing unit 116. The input unit 114 is configured to receive first image data 118 four first digital camera 32b. The input unit 114 is configured to receive the second image data 120 from a second digital camera 34b. The processing unit is configured to output pose transformation data R8, as calculate according to the computer-implemented method of the first aspect. Accordingly, the device 112 may be implemented as a processing device of a handheld smartphone capable of performing image processing operations, for example. Optionally, some or all of the tasks described above can be performed by a remote computer. For example, the images obtained using the first and second cameras, along with their distance indices, can be communicated to an external computer by a serial interface of the smartphone, or even using the WiFi™, Bluetooth™, or mobile telephony interfaces of the smartphone over a communications network. The steps for calculating the pose transformation data can then be calculated remotely from the smartphone.

The invention claimed is:

1. A computer-implemented method for generating pose transformation data between first and second rigidly mounted digital cameras having non-coincident fields of view, comprising:
    obtaining, using the first digital camera, a first plurality of images of a first calibration object in a frame of reference of a first calibration object indexed to a corresponding first plurality of measured linear displacement data of the distance between the first digital camera and the first calibration object;
    obtaining, using the second digital camera, a second plurality of images of the first or a second calibration object in the frame of reference of the respective first or second calibration objects indexed to a corresponding second plurality of measured linear displacement data of the distance between the second digital camera and the first or the second calibration object;
    generating first and second object point data based, respectively, on the first and second pluralities of images and their respective measured linear displacement data, and a prior specification of the first and/or second calibration objects;
    generating first and second calibration data of the first and second digital cameras based, respectively, on the first and second object point data;
    determining first pose data between a first frame of reference of the first digital camera and the frame of reference of the first calibration object using the first calibration data;
    determining second pose data between the frame of reference of the second digital camera and the frame of reference of the first or second calibration objects using the second calibration data; and
    calculating the pose transformation data between the pose of the first digital camera and the pose of the second digital camera as a function of the first and second pose data.

2. The computer-implemented method according to claim 1, wherein generating first object point data further comprises:
    extracting first feature point layer data of a first image in the first plurality of images;
    extracting second feature point layer data of a second image in the first plurality of images;
    comparing the feature point layer data to the prior specification of the first calibration object;
    generating first object point data corresponding to the first feature point layer data associated with the measured linear displacement data of the distance between the first calibration object and the first digital camera; and
    generating second object point data corresponding to the second feature point layer data associated with the measured linear displacement data of the distance between the first calibration object and the first digital camera.

3. The computer-implemented method according to claim 2, wherein generating first calibration data of the first digital camera further comprises:
    generating one or more 3D point clouds using the first object point data and the second object point data; and
    generating first calibration data of the first digital camera by applying a homography algorithm to the one or more 3D point clouds.

4. The computer-implemented method according to claim 1, wherein the first calibration data of the first digital camera comprises intrinsic and/or extrinsic calibration parameters of the first digital camera.

5. The computer-implemented method according to claim 1, further comprising:
    obtaining the first plurality of images of the first calibration object and the second plurality of images of the second calibration object, wherein the first and second calibration objects are aligned parallel planes arranged to face each other along an axis.

6. The computer-implemented method according to claim 1, further comprising:
    obtaining the first and second pluralities of images using the first calibration object, wherein a device comprising the first and second digital cameras is azimuthally realigned relative to the first calibration object in-between obtaining the first and second pluralities of images.

7. The computer-implemented method according to claim 1, wherein determining first pose data further comprises:
    obtaining an entire image of the first calibration object using the first digital camera when located at a first test position on the linear orthogonal axis; and
    calculating the location of the first calibration object in the reference frame of the first digital camera using the first calibration data.

8. The computer-implemented method according to claim 1, further comprising generating a reference transformation between the first and/or the second digital camera and a reference point on a device comprising the first and second digital cameras by:
    calculating a first reference transformation based upon the first pose data, the reference frame of the first calibration object, and a reference point of a calibration rig to which the device is mechanically secured;
    calculating a second reference transformation based upon the second pose data, the reference frame of the second calibration object, and the reference point of the calibration rig to which the device is mechanically secured; and combining the first and/or second reference transformations, or a weighted combination of the first and second reference transformations, to yield a device interface transformation.

9. The computer-implemented method according to claim 1, further comprising:
generating an accuracy metric of the pose transformation data;
if the accuracy metric of the pose transformation data does not meet a threshold, re-acquiring the first and/or second pluralities of the first and/or second calibration objects and repeating the calculation of the pose transformation data.

10. The computer-implemented method according to claim 1, further comprising:
outputting the pose transformation data.

11. A device for generating pose transformation data between first and second rigidly mounted digital cameras having non-coincident fields of view, comprising:
an input unit; and
a processing unit;
wherein the input unit is configured to obtain, from a first digital camera, a first plurality of images of a first calibration object in a frame of reference of a first calibration object indexed to a corresponding first plurality of measured linear displacement data of the distance between the first digital camera and the first calibration object;
wherein the input unit is configured to obtain, from the second digital camera, a second plurality of images of the first or a second calibration object in the frame of reference of the respective first or second calibration objects indexed to a corresponding second plurality of measured linear displacement data of the distance between the second digital camera and the first or the second calibration object; and
wherein the processing unit is configured to generate first and second object point data based, respectively, on the first and second pluralities of images and their respective measured linear displacement data, and a prior specification of the first and/or second calibration objects, to generate first and second calibration data of the first and second digital cameras based, respectively, on the first and second object point data, to determine first pose data between a first frame of reference of the first digital camera and the frame of reference of the first calibration object using the first calibration data, to determine second pose data between the frame of reference of the second digital camera and the frame of reference of the first or second calibration objects using the second calibration data, and to calculate the pose transformation data between the pose of the first digital camera and the pose of the second digital camera as a function of the first and second pose data.

12. A calibration rig for generating pose transformation data between first and second rigidly mounted digital cameras having non-coincident fields of view, comprising:
a first calibration object having a frame of reference related to the frame of reference of the calibration rig; and
a linearly repositionable shuttle in the frame of reference of the calibration rig configured to rigidly support a device comprising first and second rigidly mounted digital cameras at a known position on a linear orthogonal axis with respect to the first calibration object, wherein the shuttle and/or the first calibration object are configured to be repositionable relative to each other along the linear orthogonal axis;
wherein, in use, the first rigidly mounted digital camera of the device has a first frame of reference, and wherein the second rigidly mounted digital camera of the supported device has a second frame of reference; and
wherein one of the first and/or second digital cameras are used to obtain an image of the first calibration object at the known position from the respective first and/or second frames of reference.

13. The calibration rig according to claim 12, wherein the shuttle further comprises a turntable enabling the device comprising first and second rigidly mounted digital cameras to be realigned azimuthally through substantially 180 degrees with respect to the first calibration object.

14. The calibration rig according to claim 12, further comprising:
a plurality of calibrated stations on the linear orthogonal axis for positioning the shuttle in accurately preset positions.

15. The calibration rig according to claim 12, further comprising:
a second calibration object having a second frame of reference related to the frame of reference of the calibration rig and positioned on the linear orthogonal axis opposite to the first calibration object,
wherein the shuttle is configured to move along the linear orthogonal axis in-between the first and second calibration objects, and/or
wherein the first and second calibration objects are rigidly attached to each other and are configured to move along the linear orthogonal axis relative to the shuttle.

16. The calibration rig according to claim 12, further comprising:
interface electronics;
wherein the interface electronics is configured to at least obtain a measurement of the displacement of the shuttle relative to the first calibration object when one of the first and/or second digital cameras are used to obtain an image of the first calibration object from the respective first and/or second frames of reference.

17. The calibration rig according to claim 16, further comprising:
a displacement measurement device operably coupled to the interface electronics and configured to provide displacement data of the shuttle along the linear orthogonal axis relative to the first and/or second calibration object to the interface electronics.

18. The calibration rig according to claim 16, wherein the shuttle further comprises:
a laterally translatable device mount operably coupled to the interface electronics and configured to laterally translate the position of the device relative to the linear orthogonal axis.

19. The calibration rig according to claim 16, further comprising:
a motion actuator operably coupled to the interface electronics and configured to translate the position of the shuttle relative to the first and/or second calibration objects along the linear orthogonal axis, and/or to translate the first and/or second calibration objects relative to the shuttle along the linear orthogonal axis.

20. A system for generating pose transformation data between first and second rigidly mounted digital cameras having non-coincident fields of view, comprising:
a calibration rig as defined in claim 16;

a mobile computing device comprising first and second rigidly mounted digital cameras having non-coincident fields of view;

wherein the mobile computing device is operably connected to the interface electronics of the calibration rig.

* * * * *